United States Patent [19]

Skarvada

[11] 4,344,137
[45] Aug. 10, 1982

[54] APPARATUS FOR GENERATING A LEAD SIGNAL IN AN ANTISKID SYSTEM

[75] Inventor: Thomas Skarvada, Woodland Hills, Calif.

[73] Assignee: Crane Co., Chicago, Ill.

[21] Appl. No.: 146,617

[22] Filed: May 5, 1980

[51] Int. Cl.³ .................. B60T 8/00; G06F 15/20
[52] U.S. Cl. .................................. 364/426; 303/95; 303/109
[58] Field of Search ............ 364/426; 303/91, 95, 303/97, 99, 105, 106, 109; 188/181 C

[56] References Cited

U.S. PATENT DOCUMENTS

| | | | |
|---|---|---|---|
| 3,614,173 | 10/1971 | Branson | 188/181 C X |
| 3,669,508 | 6/1972 | Attri | 303/91 |
| 3,729,234 | 4/1973 | Hirzel | 303/109 |
| 3,843,208 | 10/1974 | Jones | 303/91 |
| 4,036,536 | 7/1977 | Quon | 303/97 X |
| 4,068,903 | 1/1978 | Straub | 303/99 |
| 4,180,223 | 12/1979 | Amberg | 303/106 X |

*Primary Examiner*—Jerry Smith
*Attorney, Agent, or Firm*—Hume, Clement, Brinks, William & Olds, Ltd.

[57] ABSTRACT

An antiskid braking system includes an improved apparatus for generating a lead signal to provide lead compensation. According to one feature of this apparatus the gain is a function of the algebraic sign of the input signal to the apparatus. Preferably, higher gains are used when the input signal corresponds to wheel deceleration than when it corresponds to acceleration. Another feature of the invention is that the apparatus operates to reduce the magnitude of the lead signal when it exceeds a limit value, preferably by clamping the lead signal to a maximum magnitude.

14 Claims, 5 Drawing Figures

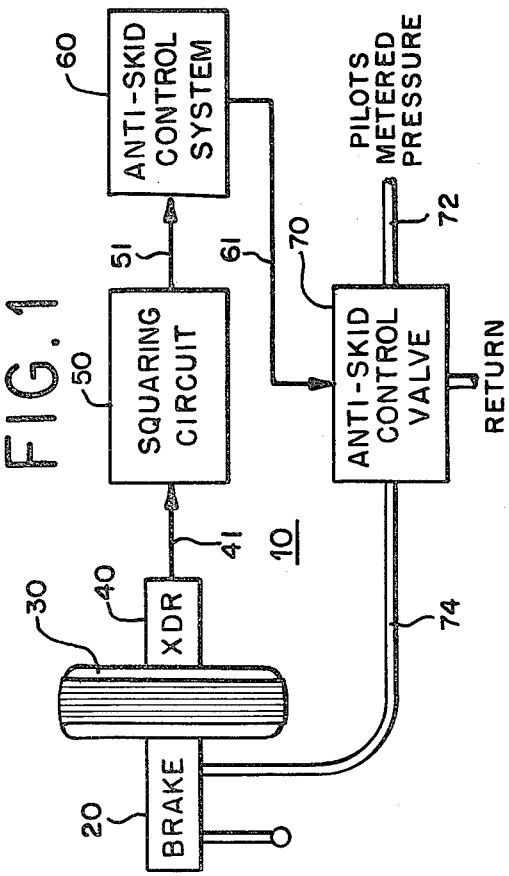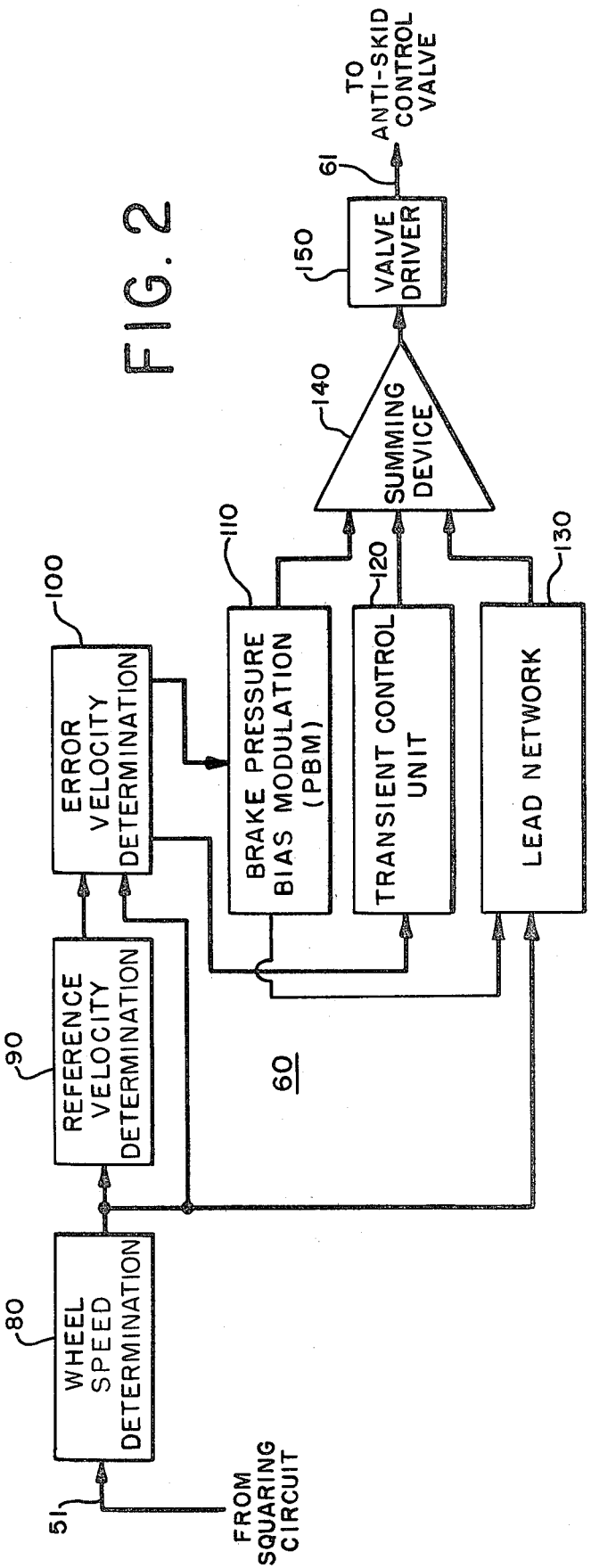

APPARATUS FOR GENERATING A LEAD SIGNAL IN AN ANTISKID SYSTEM

BACKGROUND OF THE INVENTION

This invention relates to an improved lead network in an antiskid braking system.

Antiskid systems have in the past been provided with lead networks to improve braking efficiency. Such lead networks are responsive to a time derivative of a signal and act to anticipate behavior of the braked wheel. For example, in response to a sharply decelerating wheel, a lead network acts to reduce brake pressure and to arrest the wheel deceleration and prevent wheel skids.

SUMMARY OF THE INVENTION

The present invention is directed to an improved apparatus for generating lead signal in an antiskid system. This improved apparatus provides several important features which cooperate to provide improved braking efficiency.

According to a first feature of the invention, the apparatus is provided with a gain which varies as a function of the input signal to the apparatus. For example, when the input signal is indicative of a first time derivative of wheel rotation, it has been found advantageous to provide a higher gain when the input signal indicates wheel deceleration rather than acceleration. In this case, the apparatus acts to remove brake pressure more quickly than to reapply brake pressure.

According to a second feature of the invention, the magnitude of the lead signal is reduced when it exceeds a limit value. Preferably, the lead signal is clamped to a maximum value. Clamping the lead signal permits the use of very high lead gains without excessively large lead signals. This feature of the invention, which is particularly useful when lead gain is made variable as a function of the brake control signal, permits the lead signal to respond quickly to incipient wheel skids without overcorrecting the brake control signal.

The invention, together with further objects and attendant advantages, will be best understood by reference to the following detailed description taken in connection with the accompanying drawings.

BRIEF DESCRIPTION OF THE DRAWINGS

FIG. 1 is a block diagram of a brake control system including an antiskid control system.

FIG. 2 is a detailed block diagram of the functional components of the antiskid control system of FIG. 1.

DETAILED DESCRIPTION OF A PREFERRED EMBODIMENT

Figure 3:
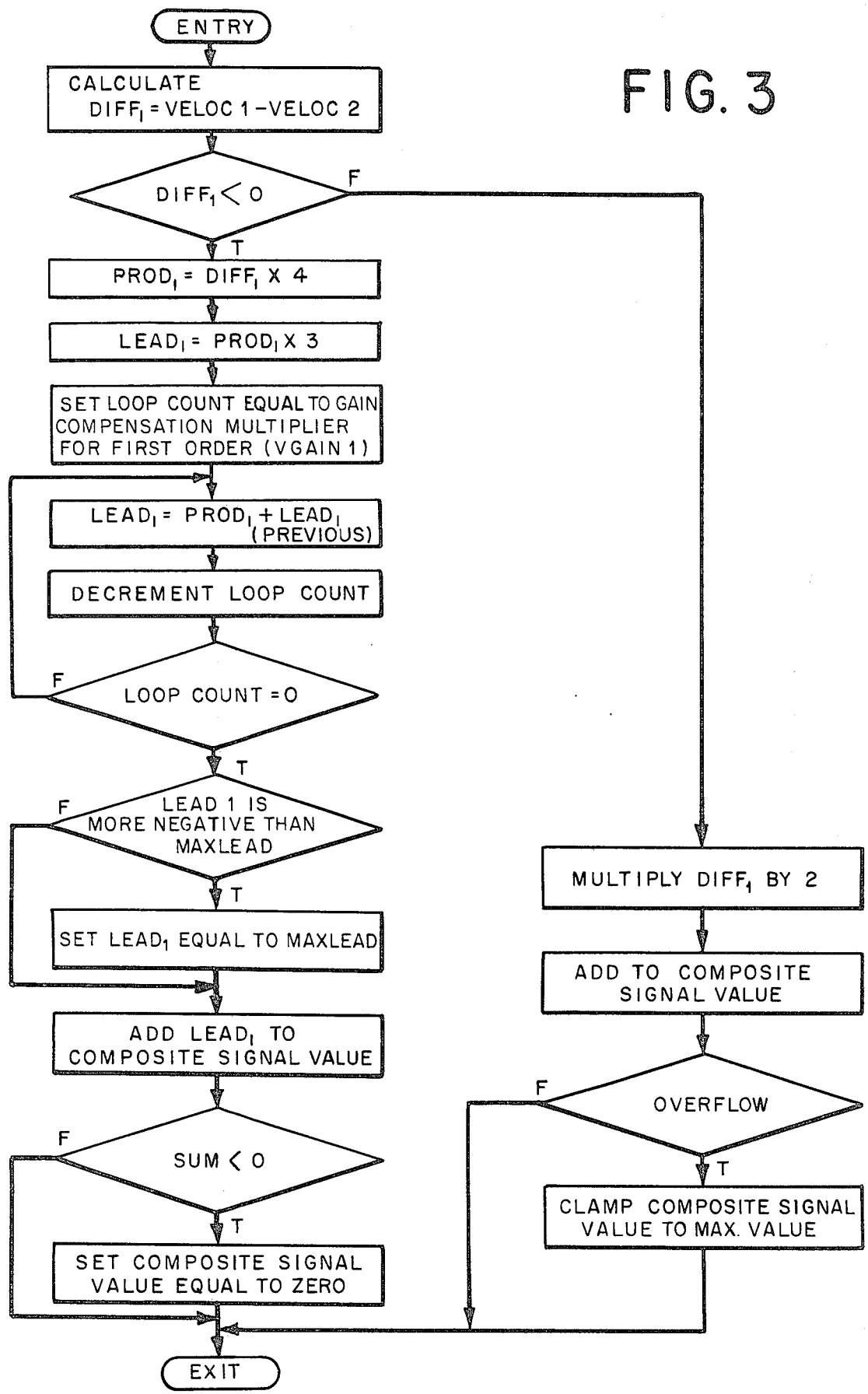
FIG. 3 is a flow chart of the first order lead portion of the lead network of FIG. 2.

Referring now to the drawings, a preferred embodiment of the improved lead network of the present invention will be described in connection with the brake control system shown in FIGS. 1 and 2. FIG. 1 shows the major components of an antiskid brake control system 10 which provides brake control for the brake 20 of a rotatable wheel 30. The system 10 includes a wheel-speed transducer 40 which produces a sinusoidal signal on line 41 having a frequency proportional to the angular velocity of the wheel 30. The signal on line 41 is shaped in a squaring circuit 50 and is then supplied as a wheel speed signal to an antiskid control system 60 via line 51. The antiskid control system 60 monitors the wheel signal on line 51. When the wheel signal indicates that the wheel 30 is about to go into a skid due to excessive braking force, the antiskid system 60 generates a brake control signal on line 61. The antiskid control valve 70 is positioned in the brake line 72 which supplies brake fluid under pressure to the brake 20, and the valve 70 operates in response to the signal on line 61 to reduce the brake pressure applied to the brake 20.

In this preferred embodiment, the brake pressure in line 72 is the metered pressure determined by the vehicle operator by means of conventional hydraulic controls. As long as the wheel 30 is not braked so severely as to go into a skid, the full metered pressure in the line 72 is passed by the valve 70 via the line 74 to the brake 20. However, if the metered brake pressure exceeds the skid threshold and drives the wheel 30 into a skid, the antiskid system 60 will generate a brake control signal on line 61 which causes the valve 70 to reduce the pressure in the lne 74 to a value less than the metered pressure. By reducing the pressure applied to the brake 30, the braking torque is reduced and the wheel 30 is prevented from skidding.

FIG. 2 shows a schematic representation of the antiskid system 60 of FIG. 1, including a wheel speed determination unit 80 which uses the wheel signal on line 51 as an input and generates an output signal representative of measured wheel speed. This wheel speed signal is supplied as an input to a reference velocity determination unit 90 for generating a reference velocity signal. This reference velocity signal is applied as an input to an apparatus 100 for determining an error velocity signal representative of the difference between the measured wheel speed signal and the reference velocity signal. The error velocity signal is applied as an input to two separate control units: the brake pressure bias modulation unit, or modulator 110, and the transient control unit 120.

The modulator 110 integrates the error velocity signal over time to arrive at a time averaged, modulated signal representative of the optimum braking pressure. This signal is smoothly and continuously modulated to either increase or decrease the applied brake pressure as needed to substantially prevent excessive wheel skidding while maintaining a high, effective level of braking.

Because the output of the modulator 110 is a time integral function of the error velocity signal, it will on occasion be unable to respond quickly enough to prevent a wheel skid. For example, when a braked wheel suddenly enters a tar strip or an ice patch or a wet surface, the skid threshold will abruptly fall and the modulator 110 may be unable to prevent a deep skid if the wheel 30 is heavily braked. Under these conditions, the transient control unit 120 responds to a large error velocity signal by commanding a sharp and sudden reduction in applied brake pressure.

The wheel speed signal is also applied as an input to a lead network 130 which responds to changes in the wheel speed signal to anticipate trends and to command an early modification in brake pressure to anticipate skids.

Outputs from the modulator 110, the transient control unit 120, and the lead network 130 are summed in a summing device 140 to produce a brake control signal which is amplified by the valve driver 150 and then applied as a control signal via line 61 to the antiskid control valve.

The foregoing description of the brake control system 10 is provided to set forth the environment of a preferred embodiment of the lead network apparatus of this invention. With the exception of the lead network 130, individual components of this environment do not form a part of the present invention, and for that reason will not be described in detail here. Furthermore, those skilled in the art are familiar with various forms of these components. For example, one form of the wheel speed determination unit 80, the error velocity determination unit 100, the modulator 110, and the transient control unit 120 is shown in U.S. Pat. No. 3,724,916, issued Apr. 3, 1973 to Edgar A. Hirzel, and entitled "Controlled Wheel Braking System". Other forms of the wheel speed determination unit 80 are described in U.S. Pat. No. 4,056,287, issued Nov. 1, 1977 to Wolfgang Gudat; and in U.S. Pat. No. 4,125,295, issued Nov. 4, 1978 to Gerhard Ruhnam, et al.

The present invention is directed to an improved lead network for a brake control system. A presently preferred embodiment of this invention, included in lead network 130 of FIG. 2, will be described in conjunction with the flow charts of FIGS. 3–5.

The presently preferred embodiment of this invention is implemented as a programmed microprocessor. The presently preferred microprocessor is a Z-80 CPU manufactured by Zilog, Inc., Cupertino, Calif. The program is presented in flow chart form in FIGS. 3–5 and is listed in assembly language form in Tables I–IV.

This program is executed periodically (203 times each second in the preferred embodiment) to determine first and second order lead signals. These lead signals are then added to signals produced by the modulator 110 and the transient control 120, and the sum is used to control the valve driver 150.

As mentioned earlier, the lead network can be used with a wide variety of brake control systems. This preferred embodiment utilizes three dynamic variables generated by the remainder of the brake control system.

First, this preferred embodiment accepts as an input the three most recent measurements of wheel velocity, which are labeled VELOC1, VELOC2, and VELOC3 in the listings. Here, VELOC1 is the most recently measured wheel velocity; VELOC2 is the wheel velocity measured in the last cycle, 1/203 of a second before VELOC1; and VELOC3 is the wheel velocity measured in the next to last cycle, 2/203 of a second before VELOC1.

Second, this embodiment accepts as an input the output signal of the modulator, labeled PBM in the listings. Here, modulator output corresponds generally to the average level of brake pressure applied to the brake 20. Thus, a high modulator output corresponds to a high coefficient of friction between the wheel 30 and the pavement. In practice, the antiskid valve 70 is generally designed to require a large current to bring about a large reduction in brake pressure and therefore the driver 150 is designed to invert the signal from the summing device 140 prior to amplification to obtain the desired relationship between modulator signal and valve control signal.

Third, this embodiment accepts as an input a signal COMPOS, which is related to the sum of the signals produced by the modulator 110 and the transient control unit 120.

Turning now to FIG. 3, the first order lead signal is determined as a function of VELOC1, VELOC2, and PBM. In each case, the first order difference of the wheel velocity, DIFF1, is set equal to VELOC1-VELOC2. The first order lead signal is then set equal to DIFF1 multiplied by a gain factor. The gain factor is not a constant, but instead varies as a function of the algebraic signal of DIFF1 and the magnitude of PBM.

As shown in FIG. 3, if VELOC1 is greater than VELOC2, indicating that wheelspeed is increasing, then the first order lead signal is set equal to two times DIFF1. This signal is then added to the composite signal COMPOS. The result is compared with a maximum value, and clamped to the maximum value if necessary to correct an overflow condition.

On the other hand, if VELOC2 is greater than VELOC1, indicating that wheelspeed is decreasing, then the first order lead signal is set equal to $(12+4(VGAIN1))DIFF1$, where VGAIN1 is a gain compensation multiplier for first order which will be explained in greater detail below. In addition, the first order lead signal is clamped to a maximum negative value if it is more negative than that value. The clamped first order lead signal is then added to COMPOS, the composite signal, and the result is set equal to zero if negative.

Figure 5:
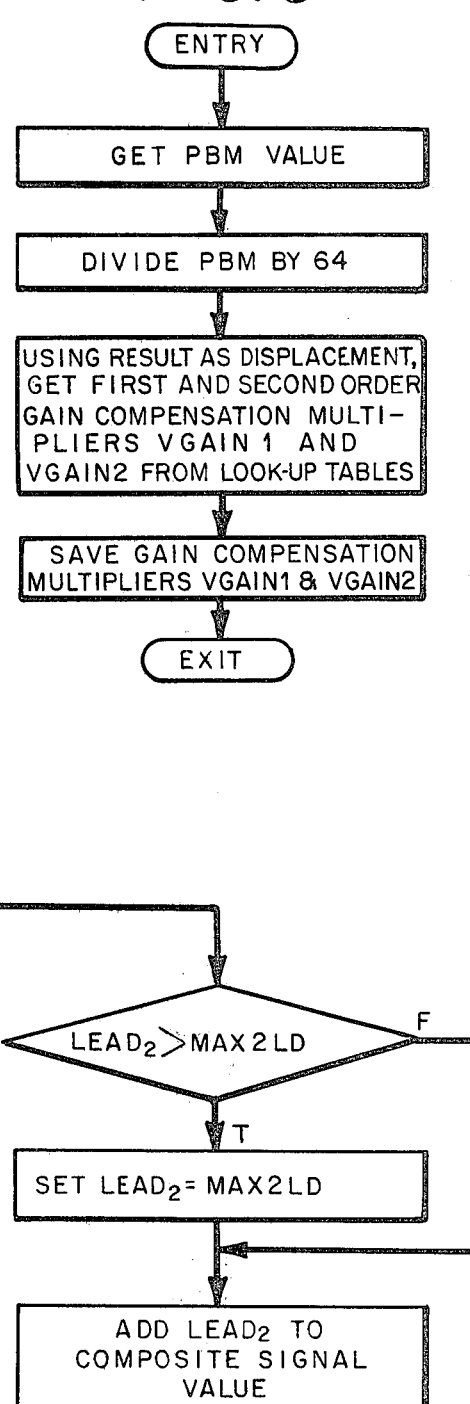
FIG. 5 is a flow chart of a routine for generating gain factors for the first and second order lead portions of the lead network of FIG. 2.

As shown in FIG. 5, the gain compensation multiplier for first order, VGAIN1, is determined in accordance with the value of the modulator output signal PBM. PBM is divided by 64 and the quotient is used as a pointer to a lookup table, Table 1. Depending on the value of PBM, the variable VGAIN1 is then set equal to one of the 32 possible values stored in Table 1.

In general, a higher value of PBM corresponds to a higher average brake pressure and a higher value of Mu, the coefficient of friction between the tire and the pavement. In high Mu conditions the wheel can quickly enter a skid due to the high drag levels and the relatively sharp peak of the Mu-slip curve. In computer simultations, it has been found preferable to increase the gain of the lead network during high Mu conditions and to reduce gain of the lead network during low Mu conditions in order to maximize braking efficienty. As shown in Table 4, the preferred embodiment varies VGAIN1 between a low of 2 for low PBM values and a high of 10 for high PBM values.

From the foregoing, it should be apparent that the first order lead network of FIG. 3 provides a high degree of flexibility. First, the gain of the lead network is a function of the sign of DIFF1, the difference between VELOC1 and VELOC2. In this preferred embodiment, the gain is set equal to 2 for positive values of DIFF1, corresponding to an accelerating wheel, and to $(12+4(VGAIN1))$ for negative values of DIFF1, corresponding to a decelerating wheel. By using a higher gain for the first order lead network for negative rather than positive lead signals, this embodiment acts to reduce brake pressure more quickly than to increase brake pressure. Thus, brake pressure is reduced quickly in the face of wheel deceleration to arrest and reverse impending skids; but brake pressure is increased less quickly in the face of wheel acceleration. In computer simulation, this assymetrical gain for the first order lead network has been found to provide increased braking effciency.

An additional feature which contributes to flexibility is the variable gain feature. First order lead gain for a decelerating wheel is equal to (12+4(VGAIN1)), and VGAIN1 varies from a low of 2 for low values of PBM (corresponding to wet or icy conditions) to a high of 10 for high values of PBM (corresponding to dry pavement). Thus, first order lead gain for a decelerating wheel is variable between 20 and 52, depending on the actual braking conditions. Of course, the actual values of VGAIN1 as a function of PBM can be chosen as necessary to optimize braking efficiency. This variable gain feature provides an important degree of flexibility that allows the antiskid system to be fine-tuned to the brake system on which it is used. In this preferred embodiment it is only the gain of the lead network that varies as a function of PBM. Other portions of the antiskid system, such as the modulator 110 and the transient control unit 120, do not vary in gain with PBM, as does the lead network.

A third important feature of the embodiment of FIG. 3 is the clamp on the magnitude of the lead signal for a decelerating wheel. Because high gains are used in connection with a wheel deceleration in the first order lead network, there is a possibility that a large deceleration could produce an unacceptably large lead signal. In order to avoid this, the lead signal is clamped to a maximum negative value if it goes more negative than the clamp value. One advantage of such a clamp is that it permits the use of high gains without creating excessively large lead signals. Such a clamped high gain lead network can respond quickly and forcefully to small variations in wheel velocity, thereby preventing incipient skids from developing into skids, and yet not introduce excessively large lead signals into the brake control signal.

Figure 4:
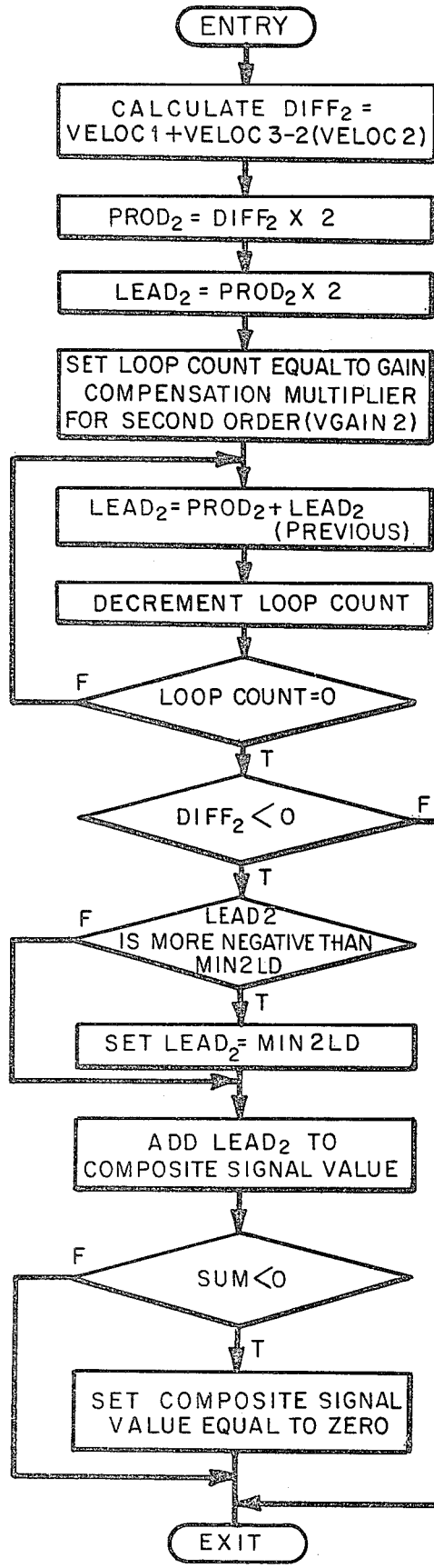
FIG. 4 is a flow chart of the second order lead portion of the lead network of FIG. 2.

FIG. 4 represents a flow chart for the second order lead network of this embodiment, which calculates the second order difference for the wheel velocity according to the formula DIFF2=VELOC1+VELOC3−2·(VELOC2). The second order difference is then multiplied by a gain factor equal to (4+2(VGAIN2)), where VGAIN2 is a variable gain factor generated by the program of FIG. 5. In this preferred embodiment, VGAIN2 is determined in the same manner as VGAIN1 except that a separate lookup table, Table 3, is used. VGAIN2 varies between 2 and 10 depending on the value of PBM. Thus, the gain factor for the second order lead ranges between 8 and 24. In contrast to the first order lead of FIG. 3, the second order lead of FIG. 4 employs the same gain factor for both accelerating and decelerating wheel conditions.

The program then branches, depending on the sign of DIFF2. If DIFF2 is positive, the lead signal is clamped to a greatest positive level and added to the composite signal. If DIFF2 is negative, the lead signal is clamped to a greatest negative level and added to the composite signal.

The second order lead of FIG. 4 embodies the variable gain feature and the clamp feature of the first order lead discussed above. Though VGAIN2 is equal to VGAIN1 in this preferred embodiment, it could easily be made to vary with PBM in a manner different from VGAIN1 by altering the contents of the appropriate lookup table.

The programs of FIGS. 3, 4 and 5 are listed in assembly language form in Tables 1, 2, 3 and 4. Table 1 corresponds to the program of FIG. 3; Table 2 corresponds to the program of FIG. 4; Table 3 corresponds to the program of FIG. 5; and Table 4 lists variables and constants used in the listings of Tables 1, 2 and 3. In order to better understand these listings, it should be understood that the wheel speed measurements stored in VELOC1 through VELOC3 are stored as sixteen bit binary numbers scaled to 0.1 foot per second per least significant bit. Preferably, these velocity measurements are updated 203 times per second, and the programs of Tables 1, 2 and 3 are executed after each update of VELOC1 through VELOC3.

In addition, the variable PBM is directly related to brake pressure and inversely related to valve current. The relationship is linear, scaled such that full scale PBM current (47 milliamps in this embodiment) corresponds to a PBM value of 1280 (hexadecimal) and zero valve current corresponds to a PBM value of 7FFF (hexadecimal). The foregoing examples of specific valve currents are given in terms of valve currents applied to a valve such as the antiskid valve described in U.S. Pat. No. 4,130,322. The constants MAXLEAD, MAX2LD, and MIN2LD are similarly related to valve current, except that the scale factor is chosen such that MAXLEAD corrsponds to a valve current reduction of 10.3 mA; MAX2LD corresponds to a valve current reduction of 20.6 mA; and MIN2LD corresponds to a valve current increase of 20.6 mA.

In the preferred embodiment described above the first and second order differences have been used as an approximation of the first and second time derivatives, respectively, of the wheel speed signal. In digital systems it is often preferable to use differences rather than derivatives. However, the novel features of the present invention can also be advantageously used with time derivatives. In the following claims the term time derivative is used in its generic sense and is meant to include approximations of derivatives such as differences.

Of course, it should be understood that various changes and modifications of the preferred embodiment described above will be apparent to those skilled in the art. For example, gains and clamp values can be changed and other antiskid systems, such as acceleration based systems, can be substituted for the velocity based antiskid system shown. In addition, it may be preferable to implement this invention in analog form in some applications. Such changes and modifications can be made without departing from the spirit and scope of the present invention and without diminishing its attendant advantages. It is therefore intended that such changes and modifications be covered by the following claims.

TABLE I

FIRST ORDER LEAD
\*\*\*\*\*\*\*\*\*\*\*\*\*\*\*\*\*\*\*\*\*\*\*\*

| | | |
|---|---|---|
| LEAD1X | LD DE,(VELOC2) | |
| | LD HL,(VELOC1) | |
| | XOR A | |
| | SBC HL,DE | |
| | JR NC,LEAD1A | |
| | ADD HL,HL | |
| | ADD HL,HL | |
| | LD D,H | |
| | LD E,L | |
| | ADD HL,HL | |
| | ADD HL,DE | |
| | LD B,(IY+VGAIN1−RAM); | GET MULTIPLIER FOR GAIN COMPENSATION |
| LEAD1C | ADD HL,DE | |
| | DJNZ LEAD1C | |

TABLE I-continued

```
           LD A,MAXLEAD; CLAMP IF LEAD IS
                         TOO BIG
           CP H
           JR C,LEAD1D
           LD HL,MAXLEAD*256
LEAD1D     LD BC,(COMPOS); GET COMPOSITE SIGNAL
                         VALUE
           ADD HL,BC
           JR C,LEAD1B
           LD HL,0
           JR LEAD1B
LEAD1A     LD D,H
           LD E,L
           ADD HL,DE
           LD BC,(COMPOS)
           ADD HL,BC
           JR NC,LEAD1B
           LD HL,OFFFH
LEAD1B     LD B,H
           LD C,L
           RET
```

TABLE II

```
;          SECOND ORDER LEAD
;          *************************
;
LEAD2X     LD HL,(VELOC1); GET NEW VELOCITY
           LD DE,(VELOC3); GET OLD VELOCITY
           ADD HL,DE
           LD DE,(VELOC2)
           XOR A; CLEAR CARRY
           SBC HL,DE
           XOR A
           SBC HL,DE
           PUSH AF; SAVE FLAGS
           ADD HL,HL
           LD D,H
           LD E,L
           ADD HL,HL
           PUSH BC
           LD B,(IY+VGAIN2-RAM)
LEAD2B     ADD HL,DE
           DJNZ LEAD2B
           POP BC
           POP AF
           JR C,LEAD2A
           LD A, MAX2LD; CLAMP VALUE
           CP H
           JR NC,LEAD2C; SKIP IF LESS
           LD HL,MAX2LD*256
LEAD2C     ADD HL,BC
           JR LEAD2E
LEAD2A     LD A,MIN2LD; MINIMUM CLAMP
           CP H
           JR C,LEAD2D
           LD HL,MIN2LD*256
LEAD2D     ADD HL,BC
           JR C,LEAD2E
           LD HL,0
LEAD2E     RET
;
```

TABLE III

```
;
;          LEAD GAIN COMPENSATION
;          *******************************
;
TORQX      LD DE,(PBM)
           SRL D
           SRL D
           LD HL,TABLE1
           LD E,D
           LD D,0
           ADD HL,DE
           LD A,(HL)
           LD (VGAIN1),A
```

TABLE III-continued

```
           LD HL,TABLE3
           ADD HL,DE
           LD A,(HL)
           LD (VGAIN2),A
           RET
;
```

TABLE IV

```
;
;          FIRST ORDER LEAD
;          VARIABLE GAIN
;          LOOKUP TABLE
;          *********************
;
TABLE1     BYTE 2,2,2,2,2,3,3,3,4,4,4,4
           BYTE 5,5,5,5,8,8,8,8,10,10,10,10,10
           BYTE 10,10,10,10,10,10,10
;
;
;          SECOND ORDER LEAD
;          VARIABLE GAIN
;          LOOKUP TABLE
;          *************************
;
TABLE3     BYTE 2,2,2,2,2,3,3,3,4,4,4,4
           BYTE 5,5,5,5,8,8,8,8,10,10,10,10
           BYTE 10,10,10,10,10,10,10
;
;          GENERAL CONSTANTS
;          *************************
;
MAXLEAD    EQU OFDH; CLAMP FOR LEAD VALUE
                     (10 MA PRESS REDUCTION)
MAX2LD     EQU 6; MAX CLAMP FOR 2ND LEAD
                     (21 MA)
MIN2LD     EQU -6; MIN CLAMP FOR 2ND LEAD
                     (-21 MA)
;
;          RAM
;          *****
;
VELOC1     EQU 820H; NEW VELOCITY
VELOC2     EQU 822H; PREVIOUS VELOCITY
                     (ONE LOOP TIME BACK)
VELOC3     EQU 824H; PREVIOUS VELOCITY
                     (TWO LOOP TIMES BACK)
VGAIN1     EQU 817H; FIRST ORDER GAIN
                     COMPENSATION MULTIPLIER
VGAIN2     EQU 81DH; SECOND ORDER GAIN
                     COMPENSATION MULTIPLIER
RAM        EQU 800H; BEGINNING OF RAM
PBM        EQU 80AH; PBM VALUE (TWO BYTES)
COMPOS     EQU 812H; COMPOSITE VALUE
                     (TWO BYTES)
;
```

I claim:

1. In an antiskid system including a wheel, a brake coupled to the wheel, means for generating a wheel signal indicative of a selected time derivative of the angular position of the wheel, means responsive to the wheel signal for generating a brake control signal, and means responsive to the brake control signal for reducing braking action of the brake, the improvement comprising:

means for generating an input signal indicative of a predetermined time derivative of the angular position of the wheel, said predetermined time derivative corresponding to a higher order time derivative of the angular position of the wheel than the selected time derivative of the angular position of the wheel;

means for generating a gain signal in response to the input signal such that the gain signal is set to a first gain value when the input signal is within a first range of values and to a second gain value when the input signal is within a second range of values;

means, responsive to the input signal and the gain signal, for generating a lead signal which varies as a function of both the input signal and the gain signal; and means for modifying the brake control signal as a function of the lead signal to provide lead compensation.

2. The improvement of claim 1 wherein the first range of input signal values corresponds to positive values of the time derivative, the second range of input signal values corresponds to negative values of the time derivative, and the first gain value is less than the second gain value such that the magnitude of the lead signal is greater for negative values of the input signal than for corresponding positive values of the input signal.

3. The improvement of claim 1 or 2 wherein the input signal is indicative of the first time derivative of the angular velocity of the wheel.

4. The improvement of claim 2 wherein the lead signal generating means generates the lead signal as a direct function of both the input signal and the gain signal.

5. The improvement of claim 1 or 2 further including means for reducing the magnitude of the lead signal when the magnitude of the lead signal exceeds the magnitude of a limit value and the algebraic sign of the lead signal corresponds to the algebraic sign of the limit value.

6. The improvement of claim 1 or 2 further including means for clamping the magnitude of the lead signal to a clamp value when the magnitude of the lead signal exceeds the magnitude of the clamp value and the algebraic sign of the lead signal corresponds to the algebraic sign of the clamp value.

7. The improvement of claim 1 wherein the means for generating the lead signal operates to generate the lead signal as a function of the product of the gain factor and the input signal.

8. In an antiskid system including a wheel, a brake coupled to the wheel, means for generating a wheel signal indicative of a selected time derivative of the angular position of the wheel, means responsive to the wheel signal for generating a brake control signal, and means responsive to the brake control signal for reducing braking action of the brake, the improvement comprising:

means for generating a lead signal as a function of a predetermined time derivative of the angular velocity of the wheel, said predetermined time derivative corresponding to a higher order time derivative of the angular position of the wheel than the selected time derivative of the angular position of the wheel;

means for reducing the magnitude of the lead signal when the magnitude of the lead signal exceeds the magnitude of a first limit value and the algebraic sign of the lead signal corresponds to the algebraic sign of the limit value; and means for modifying the brake control signal as a function of the lead signal, as modified by the reducing means when the magnitude of the lead signal exceeds the magnitude of the first limit value and the algebraic sign of the lead signal corresponds to the algebraic sign of the limit value, to provide lead compensation.

9. In an antiskid system including a wheel, a brake coupled to the wheel, means for generating a wheel signal indicative of a selected time derivative of the angular position of the wheel, means responsive to the wheel signal for generating a brake control signal, and means responsive to the brake control signal for reducing braking action of the brake, the improvement comprising:

means for clamping the lead signal to a positive clamp value when the lead signal exceeds the positive clamp value in a positive direction;

means for clamping the lead signal to a negative clamp value when the lead signal exceeds the negative clamp value in a negative direction; and means for modifying the brake control signal as a function of the lead signal, as clamped by the positive and negative clamping means when the lead signal exceeds the positive clamp value in a positive direction and when the lead signal exceeds the negative clamp value in a negative direction, respectively, to provide lead compensation.

10. In an antiskid system including a wheel, a brake coupled to the wheel, means for generating a wheel signal indicative of a selected time derivative of the angular position of the wheel, means responsive to the wheel signal for generating a brake control signal, and means responsive to the brake control signal for reducing braking action of the brake, the improvement comprising:

means for generating a lead signal as a function of a predetermined time derivative of the angular velocity of the wheel, said predetermined time derivative corresponding to a higher order time derivative of the angular position of the wheel than the selected time derivative of the angular position of the wheel;

means for generating a lead signal as a function of a predetermined time derivative of the angular velocity of the wheel, said predetermined time derivative corresponding to a higher order time derivative of the angular position of the wheel than the selected time derivative of the angular position of the wheel;

means for clamping the magnitude of the lead signal to a clamp value when the magnitude of the lead signal exceeds the magnitude of the clamp value and the algebraic sign of the lead signal corresponds to the algebraic sign of the clamp value; and means for modifying the brake control signal as a function of the lead signal, as clamped by the clamping means when the magnitude of the lead signal exceeds the magnitude of the clamp value and the algebraic sign of the lead signal corresponds to the algebraic sign of the clamp value, to provide lead compensation.

11. The improvement of claim 1 or 8 or 9 or 10 wherein the means for generating the lead signal operates to generate the lead signal such that the lead signal is substantially equal to zero only when the predetermined time derivative is substantially equal to zero.

12. In an antiskid system including a wheel, a brake coupled to the wheel, means for generating a wheel signal indicative of a selected time derivative of the angular position of the wheel, means responsive to the wheel signal for generating a brake control signal, and means responsive to the brake control signal for reducing braking action of the brake, the improvement comprising:

a computer responsive to the wheel signal;

means, included in the computer, for generating an input signal indicative of a predetermined time derivative of the wheel signal such that the input signal is indicative of a higher order time derivative of the angular position of the wheel than is the wheel signal;

first means, included in the computer, responsive to the input signal and operative only when the input signal is greater than zero, for generating a lead signal as a function of the product of the input signal and a first gain;

second means, included in the computer, responsive to the input signal, and operative only when the input signal is less than zero, for generating the lead signal as a function of the product of the input signal and a second gain, said second gain differing from the first gain; and means for modifying the brake control signal as a function of the lead signal to provide lead compensation.

13. The improvement of claim 12 wherein the first gain is less than the second gain such that the magnitude of the lead signal for a given acceleration of the wheel is less than the magnitude of the lead signal for the corresponding deceleration of the wheel.

14. The improvement of claim 12 or 13 further including means for clamping the magnitude of the lead signal to a clamp value when the magnitude of the lead signal exceeds the magnitude of the clamp value and the algebraic sign of the lead signal corresponds to the algebraic sign of the clamp value.

* * * * *

UNITED STATES PATENT AND TRADEMARK OFFICE
CERTIFICATE OF CORRECTION

PATENT NO. : 4,344,137

DATED : Aug. 10, 1982

INVENTOR(S) : Thomas Skarvada

It is certified that error appears in the above—identified patent and that said Letters Patent is hereby corrected as shown below:

Column 2, line 25, delete "lne" and insert therefor --line--.

Column 3, line 23, delete "Nov. 4" and insert therefor --Nov. 14--.

Column 4, line 12, delete "signal" and insert therefor --sign--.

Column 4, line 44, delete "simultations" and insert therefor --simulations--.

Column 6, line 23, delete "corrsponds" and insert therefor --corresponds--.

Please delete Claims 9 and 10 and insert therefor the following:

--9. In an antiskid system including a wheel, a brake coupled to the wheel, means for generating a wheel signal indicative of a selected time derivative of the angular position of the wheel, means responsive to the wheel signal for generating a brake control signal, and means responsive to the brake control signal for reducing braking action of the brake, the improvement comprising:

means for generating a lead signal as a function of a predetermined time derivative of the angular velocity of the wheel, said predetermined time derivative corresponding to a higher order time derivative of the angular position of the wheel than the selected time derivative of the angular position of the wheel;

UNITED STATES PATENT AND TRADEMARK OFFICE
CERTIFICATE OF CORRECTION

PATENT NO. : 4,344,137
DATED : Aug. 10, 1982
INVENTOR(S) : Thomas Skarvada

It is certified that error appears in the above—identified patent and that said Letters Patent is hereby corrected as shown below:

means for clamping the lead signal to a positive clamp value when the lead signal exceeds the positive clamp value in a positive direction;

means for clamping the lead signal to a negative clamp value when the lead signal exceeds the negative clamp value in a negative direction; and means for modifying the brake control signal as a function of the lead signal, as clamped by the positive and negative clamping means when the lead signal exceeds the positive clamp value in a positive direction and when the lead signal exceeds the negative clamp value in a negative direction, respectively, to provide lead compensation.

10. In an antiskid system including a wheel, a brake coupled to the wheel, means for generating a wheel signal indicative of a selected time derivative of the angular position of the wheel, means responsive to the wheel signal for generating a brake control signal, and means responsive to the brake control signal for reducing braking action of the brake, the improvement comprising:

means for generating a lead signal as a function of a predetermined time derivative of the angular velocity of the wheel, said predetermined time derivative corresponding to a higher order time derivative of the angular position of the wheel than the selected time derivative of the angular position of the wheel;

UNITED STATES PATENT AND TRADEMARK OFFICE
CERTIFICATE OF CORRECTION

PATENT NO. : 4,344,137
DATED : Aug. 10, 1982
INVENTOR(S) : Thomas Skarvada

It is certified that error appears in the above—identified patent and that said Letters Patent is hereby corrected as shown below:

means for clamping the magnitude of the lead signal to a clamp value when the magnitude of the lead signal exceeds the magnitude of the clamp value and the algebraic sign of the lead signal corresponds to the algebraic sign of the clamp value; and means for modifying the brake control signal as a function of the lead signal, as clamped by the clamping means when the magnitude of the lead signal exceeds the magnitude of the clamp value and the algebraic sign of the lead signal corresponds to the algebraic sign of the clamp value, to provide lead compensation.--

Signed and Sealed this

Twenty-first Day of June 1983

[SEAL]

Attest:

DONALD J. QUIGG

*Attesting Officer*   *Acting Commissioner of Patents and Trademarks*